(12) United States Patent
Maekawa et al.

(10) Patent No.: US 7,316,757 B2
(45) Date of Patent: Jan. 8, 2008

(54) METHOD OF PRODUCING RADIAL TIRE FOR CONSTRUCTION VEHICLE

(75) Inventors: Tsuyoshi Maekawa, Onomichi (JP); Heikichi Nakanome, Onomichi (JP); Ken Takahashi, Hiratsuka (JP)

(73) Assignee: The Yokahama Rubber Co., Ltd., Tokyo (JP)

( * ) Notice: Subject to any disclaimer, the term of this patent is extended or adjusted under 35 U.S.C. 154(b) by 354 days.

(21) Appl. No.: 10/544,106

(22) PCT Filed: Mar. 5, 2004

(86) PCT No.: PCT/JP2004/002904

§ 371 (c)(1),
(2), (4) Date: Aug. 2, 2005

(87) PCT Pub. No.: WO2004/080702

PCT Pub. Date: Sep. 23, 2004

(65) Prior Publication Data

US 2006/0048883 A1    Mar. 9, 2006

(30) Foreign Application Priority Data

Mar. 14, 2003  (JP) ............................. 2003-069899

(51) Int. Cl.
  *B29D 30/20* (2006.01)
  *B29D 30/30* (2006.01)
(52) U.S. Cl. .................... 156/111; 156/123; 156/130
(58) Field of Classification Search ............. 156/111, 156/123, 126, 130, 133, 130.5, 396, 416, 156/415, 406.2; 425/31–33
See application file for complete search history.

(56) References Cited

U.S. PATENT DOCUMENTS

| 1,732,778 | A | * | 10/1929 | Snyder | ................... | 425/31 |
| 3,873,397 | A | * | 3/1975 | Leblond et al. | ............. | 156/415 |
| 3,909,337 | A | * | 9/1975 | Yabe | ........................ | 156/416 |
| 3,945,866 | A | * | 3/1976 | Rudder et al. | ............. | 156/126 |
| 4,239,565 | A | * | 12/1980 | Henley et al. | ............. | 156/126 |

FOREIGN PATENT DOCUMENTS

| JP | 49-015776 A | 2/1974 |
| JP | 49-074284 A | 7/1974 |
| JP | 49-090380 A | 8/1974 |

OTHER PUBLICATIONS

PCT International Search Report for PCT/JP2004/002904 mailed on Jun. 15, 2004.

* cited by examiner

*Primary Examiner*—Geoffrey L. Knable
(74) *Attorney, Agent, or Firm*—Greer, Burns & Crain, Ltd.

(57) ABSTRACT

A method of producing a radial tire for a construction vehicle, the method enabling a vast reduction in facility costs. A first green tire is formed in a first step molding machine and then removed from it. After that, a vulcanizer bladder unit is installed on the tire. The tire is inflated by the vulcanizer bladder unit and then again placed in the first step molding machine with the vulcanizer bladder unit installed. After that, on the first step molding machine, belts and tread rubber are adhered to the outer periphery of the tire to form a completed green tire. Then the completed green tire, with the vulcanizer bladder unit, is assembled in a vulcanizing mold for vulcanization.

4 Claims, 5 Drawing Sheets

METHOD OF PRODUCING RADIAL TIRE FOR CONSTRUCTION VEHICLE

FIELD OF THE INVENTION

The present invention relates to a method of producing a radial tire for a construction vehicle, and more specifically to a method of producing a radial tire for a construction vehicle which enables costs for production facilities to be reduced.

BACKGROUND ART

In general, an increasing number of tires of a radial structure have been produced to meet needs from users in the field of large-sized tires for construction vehicles which are termed as OR tires (Off-the-Road Tires). A method of producing such a radial tire is usually performed with the following procedure. To begin with, a first green tire which has only a tire carcass including a carcass ply and a bead core is formed by use of a first step molding machine. By use of a second step molding machine, subsequently, the first green tire is inflated to have an external diameter of a predetermined size, and belts and tread rubber are wound around the outer periphery of the first green tire thus inflated. Thereby, the first green tire is formed into a completed green tire. Thereafter, the completed green tire is cured by use of a curing machine.

Heretofore, Japanese patent application *Kokai* publication No. Sho.49-15776 has proposed a measure for improving a method of producing a pneumatic radial tire, according to which a single bladder is used dually as an inflating bladder of the second step molding machine and as an inflating bladder of the curing machine, thereby simplifying the production facilities. However, what costs most in the facilities for producing radial tires is the first step molding machine and the second step molding machine. According to the aforementioned measure for improving the method of producing a pneumatic radical tire, the first step molding machine and the second step molding machine are still the required facilities. For this reason, the aforementioned measure still needs not only large costs for these machines but also a large space where the machines are installed. As a consequence, the proposed measure has not been a fundamental measure for improving the method of producing a pneumatic radial tire.

SUMMARY OF THE INVENTION

An object of the present invention is to provide a method of producing a radial tire for a construction vehicle which causes facilities costs for the first step molding machine and the second step molding machine to be reduced to a large extent.

In order to achieve the aforementioned object, a method of producing a radial tire for a construction vehicle according to the present invention is characterized in that a first green tire is formed by a first step molding machine; thereafter, the first green tire is removed from the first step molding machine; a vulcanizer bladder unit is installed on the first green tire thus removed, and the first green tire is inflated by the vulcanizer bladder unit; subsequently the first green tire is once again placed in the first step molding machine while the vaulcanizer bladder unit is still being installed to the first green tire; belts and tread rubber are adhered to the outer periphery of the first green tire on the first step molding machine, thus forming the first green tire into a completed green tire; and the completed green tire is assembled into a vulcanizing mold while the vulcanizer bladder unit is still being installed to the completed green tire, thereby vulcanizing and forming the completed green tire.

In general, the conventional first step molding machine for forming the first green tire does not include a bladder, since no inflating operation is performed during the molding step. On the other hand, the second step molding machine needs to perform the operation of inflating the first green tire. For this reason, as long as the first step molding machine is constituted as to be a conventional structure, the first step molding machine cannot be dually used as the second step molding machine.

However, according to the present invention, a vulcanizer bladder unit independent from the molding machine is installed to the first green tire which has been formed by the first step molding machine, and the first green tire is inflated by this vulcanizer bladder unit. Thereafter, this first green tire is once again placed in the first step molding machine while the vulcanizer bladder unit is still being installed to the first green tire. Then, belts and tread rubber are adhered to the first green tire. In this manner, the second step molding process is performed. This procedure no longer requires the specialized second step molding machine. As a consequence, the present invention not only entails no facilities costs for the specialized second step molding machine, but also requires no space in which the second step molding machine would otherwise be installed. Accordingly, the present invention enables costs to be reduced to a large extent.

DETAILED DESCRIPTION OF THE PREFERRED EMBODIMENTS

Figure 1:
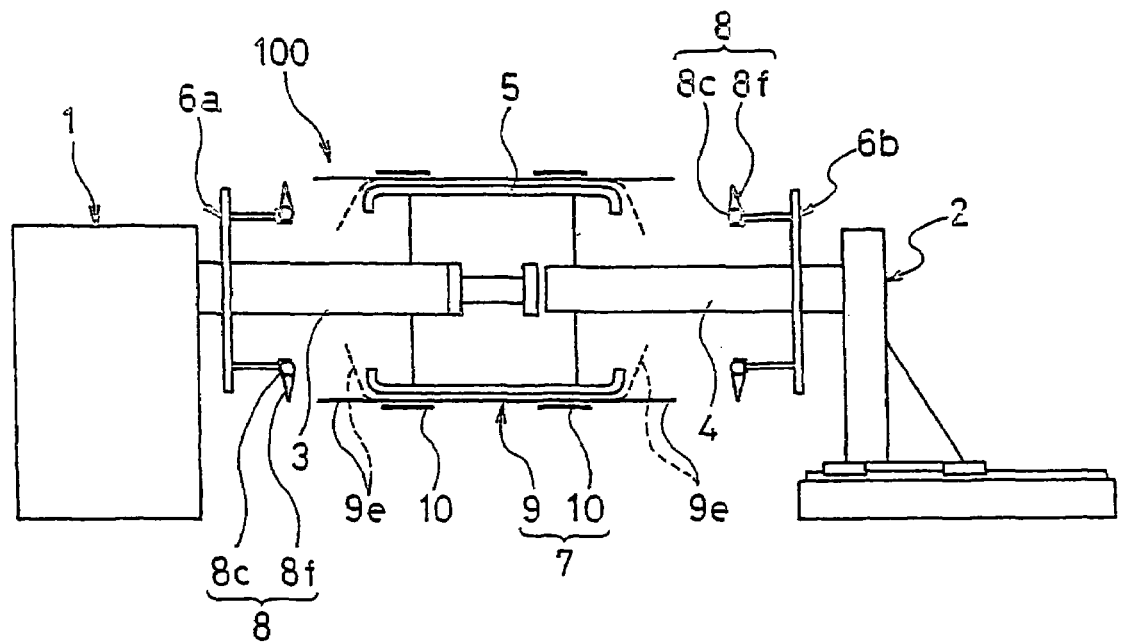
FIG. 1 is an explanatory diagram showing a process of forming a first green tire by use of a first step molding machine according to the present invention.
Figure 2:
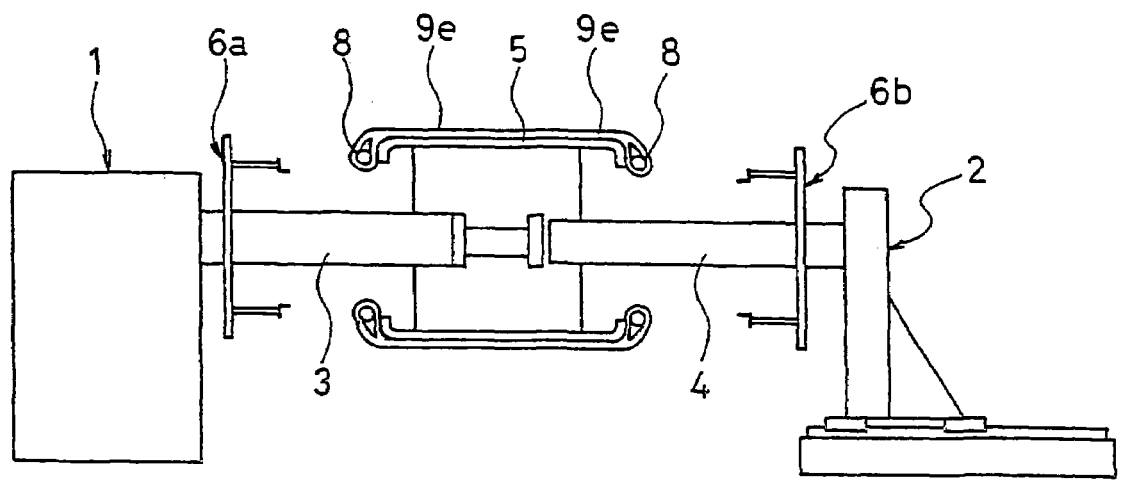
FIG. 2 is an explanatory diagram showing a process of forming the first green tire following the process of FIG. 1 by the first step molding machine.
Figure 3:
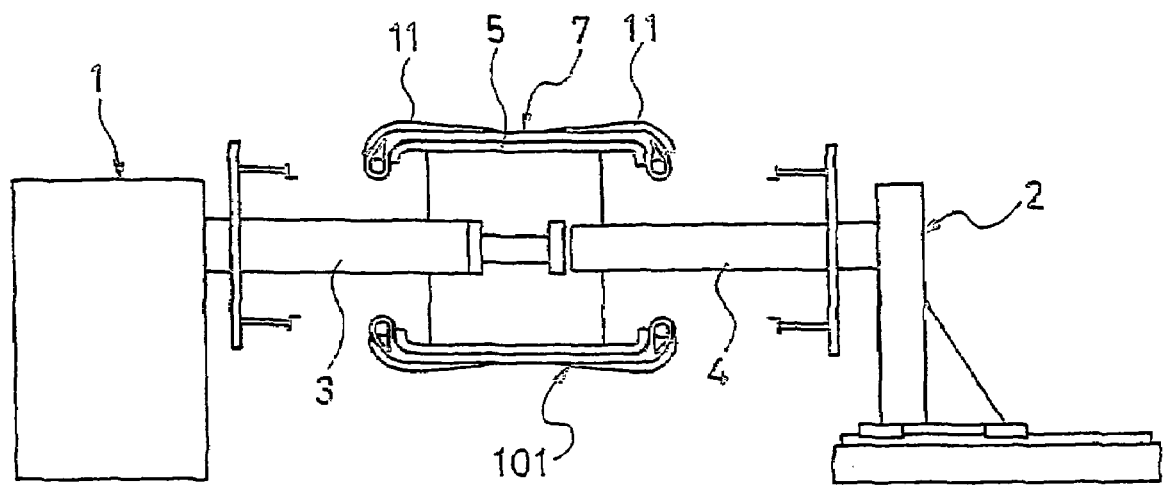
FIG. 3 is an explanatory diagram showing a process of forming the first green tire following the process of FIG. 2 by the first step molding machine.

FIGS. 1 to 3 are diagrams respectively showing examples of a process of forming a first green tire by use of a first step molding machine according to a step sequence in a method of producing a radial tire for a construction vehicle according to the present invention.

Reference numeral 100 denotes a first step molding machine. In the first step molding machine 100, reference numerals 1 and 2 respectively denote a headstock and a tailstock. The headstock 1 is provided with a drive shaft 3. A forming drum 5 is mounted detachably onto the drive shaft 3. The forming drum 5 is configured changeably to extend and reduce its radius. In addition, the tailstock 2 is provided with a driven shaft 4. The driven shaft 4 is designed to rotate in conjunction with the drive shaft 3 and the forming drum 5. A bead supplying unit 6a is fitted to the drive shaft 3, and a bead supplying unit 6b is fitted to the driven shaft 4. The bead supplying units 6a and 6b are designed to reciprocate on the drive shaft 3 and the driven shaft 4 respectively. Thereby, the bead supplying units 6a and 6b come close to, and apart from, the forming drum 5.

With regard to the process of forming a first green tire, first of all, as shown in FIG. 1, a cylinder-shaped band 7 which has been separately formed in advance by a band forming machine, which is not illustrated, is mounted onto the forming drum 5 of the first step molding machine 100. In addition, a bead core assembly 8, which has been formed by fitting a bead filler 8f of green rubber to a ring-shaped bead core 8c, is attached to each of the bead supplying units 6a and 6b. The bead core 8c is formed by winding steel wire in a ring several times. The cylinder-shaped band 7 is formed by using a carcass ply 9 as a base. In the carcass ply 9, organic fiber cords or steel cords are arranged in parallel in the drum-axis direction. An inner liner layer made of rubber with no permeability to air is applied to the inner periphery of the carcass ply 9. In addition, reinforcement plies 10 and 10 are adhered respectively to the two end portions of the outer periphery of the forming drum 5 in the axis direction.

Subsequently, the end portions 9e and 9e of the carcass ply 9 are folded inward in the radial directions respectively as shown with broken lines. Then, the bead supplying units 6a and 6b. are displaced respectively toward the two end portions of the forming drum 5 to the folded end portions 9e and 9e, and the bead core assemblies 8 and 8 respectively on the bead supplying units 6a and 6b are transferred respectively to the end portions 9e and 9e of the carcass ply 9.

Thence, the end portions 9e and 9e of the carcass ply 9 are folded back in a way that the bead core assemblies 8 and 8 are wrapped respectively in the end portions 9e and 9e of the carcass ply 9. Thereby, the end portions 9e and 9e are put into a condition as shown in FIG. 2. Furthermore, as shown in FIG. 3, two sheets of side rubber 11 and 11 are wound around the outer peripheries of the end portions 9e and 9e thus folded back of the carcass ply 9 in the circumferential direction respectively. Thereby, the first green tire 101 thus formed is completed.

Figure 4:
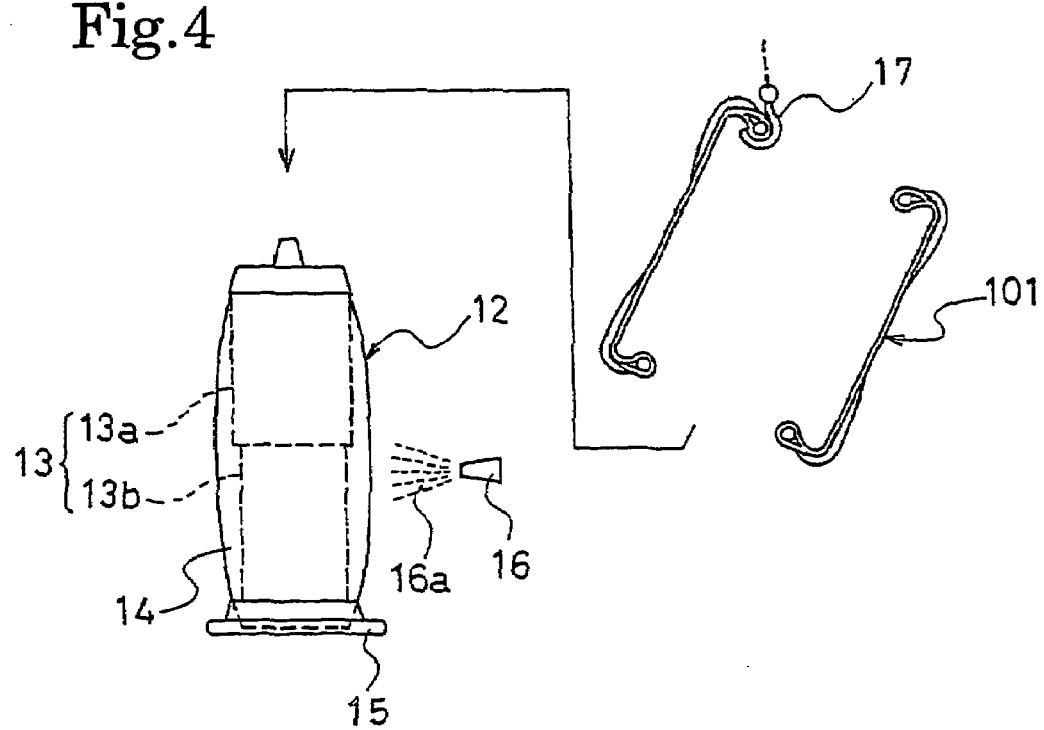
FIG. 4 is an explanatory diagram showing a process of installing a vulcanizer bladder unit to the first green tire which has been removed from the first step molding machine.
Figure 5:
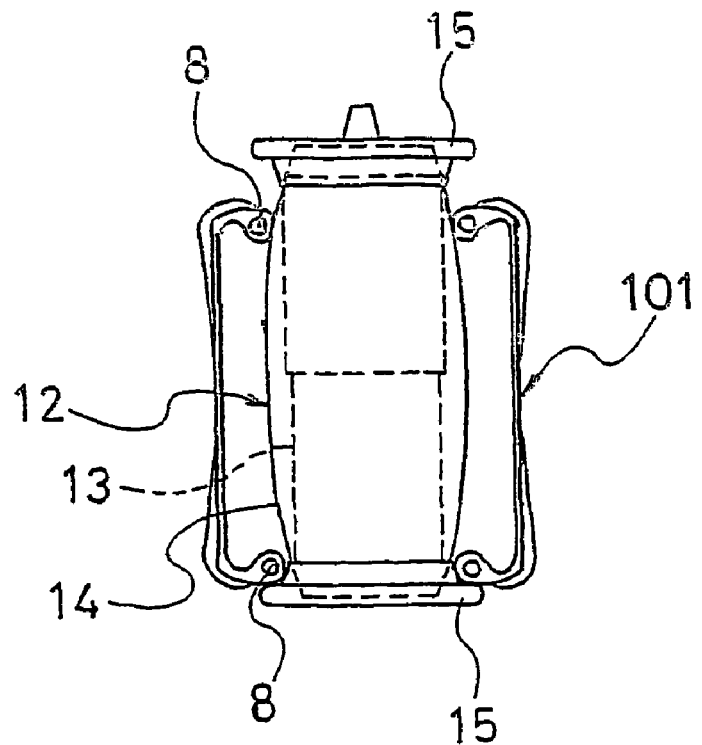
FIG. 5 is a cross-sectional view showing a condition in which the vulcanizer bladder unit has been installed to the first green tire.

Subsequently, the first green tire 101, shaped like a cylinder, which has been formed in the manner as described above, is removed from the forming drum 5 of the first step molding machine 100. A vulcanizer bladder unit 12 is attached to the inside of the first green tire 101 thus removed, as shown in FIGS. 4 and 5. The valcanizer bladder unit 12 is the same as a vulcanizer bladder unit to be used for inflating a completed green tire in a curing process which will be described later. The vulcanizer bladder unit 12 is designed to be installed detachably to the curing machine. The vulcanizer bladder unit 12 is configured of a cylinder body 13 of an expandable and contractible structure, which is constituted of a pair of cylinders 13a and 13b movable relatively in the axis direction and a cylinder-shaped bladder 14 which covers the outside of the cylinder body 13.

The first green tire 101 for a construction vehicle is extremely heavy. For this reason, the first green tire 101 may be hoisted by a crane with a hook 17 as shown in FIG. 4, or may be carried with a forklift, in a process of mounting the first green tire onto the vulcanizer bladder unit 12. In addition, it is preferable that a surface of the bladder 14 of the vulcanizer bladder unit 12 may be coated with a mold lubricant 16a by a spray nozzle 16 or the like before the first green tire 101 is mounted onto the vulcanizer bladder unit 12. Furthermore, after the mounting of the first green tire 101 onto the vulcanizer bladder unit 12 is completed, bead rings 15 and 15 are attached respectively to the two end portions of the vulcanizer bladder unit 12 as shown in FIG. 5, thus making sure that the first green tire 101 does not slip out of the vulcanizer bladder unit 12 easily.

Figure 6:
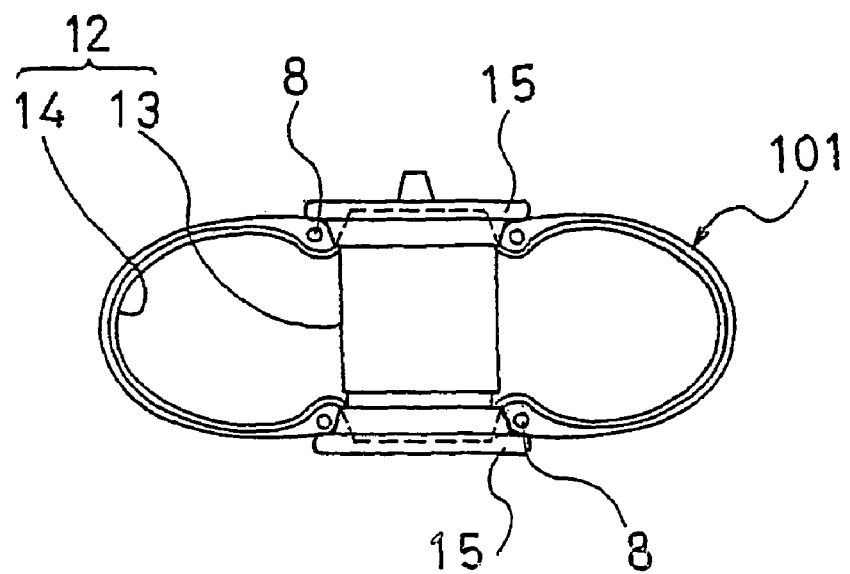
FIG. 6 is a cross-sectional view showing a condition in which the first green tire in the condition of FIG. 5 is inflated by use of the vulcanizer bladder unit.

As shown in FIG. 6, subsequently, compressed air is supplied to the vulcanizer bladder unit 12 while the cylinder body 13 of the vulcanizer bladder unit 12 is contracted in the axis direction. Thus, a distance between the bead portions respectively on the two ends of the first green tire 101 is set at a predetermined rim width. Subsequently, the bladder 14 is further distended to inflate the outside diameter of the first green tire 101 to a diameter in which belts are adhered. Thereafter, the outside diameter of the first green tire 101 is locked in an inflated condition.

Figure 7:
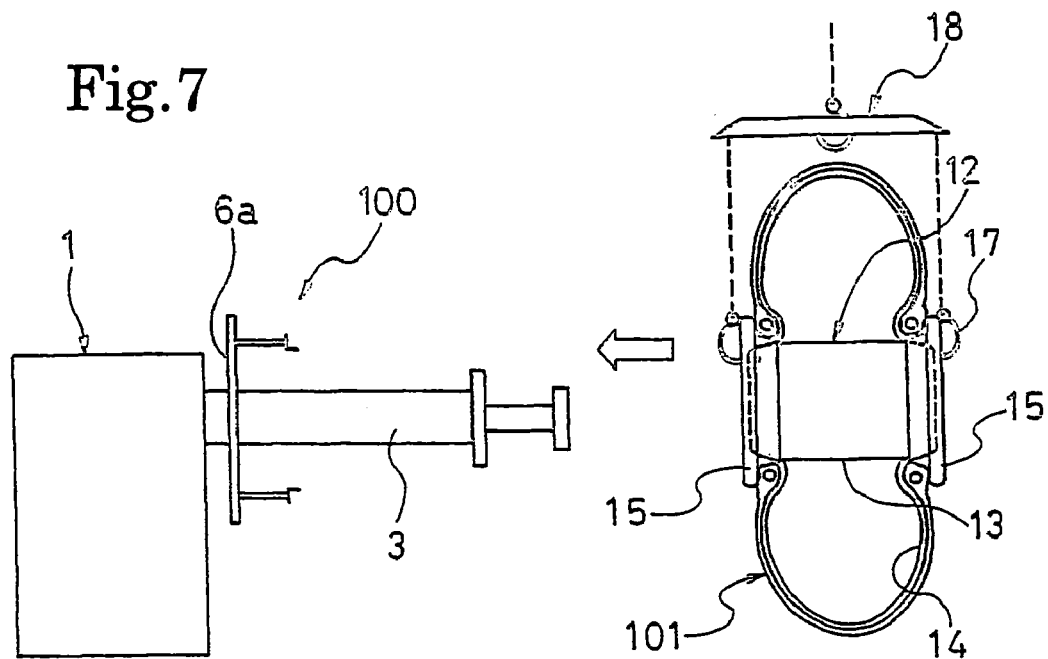
FIG. 7 is an explanatory diagram showing a process of placing the first green tire in an inflated condition, which is obtained in FIG. 6, in the first step molding machine once again.
Figure 8:
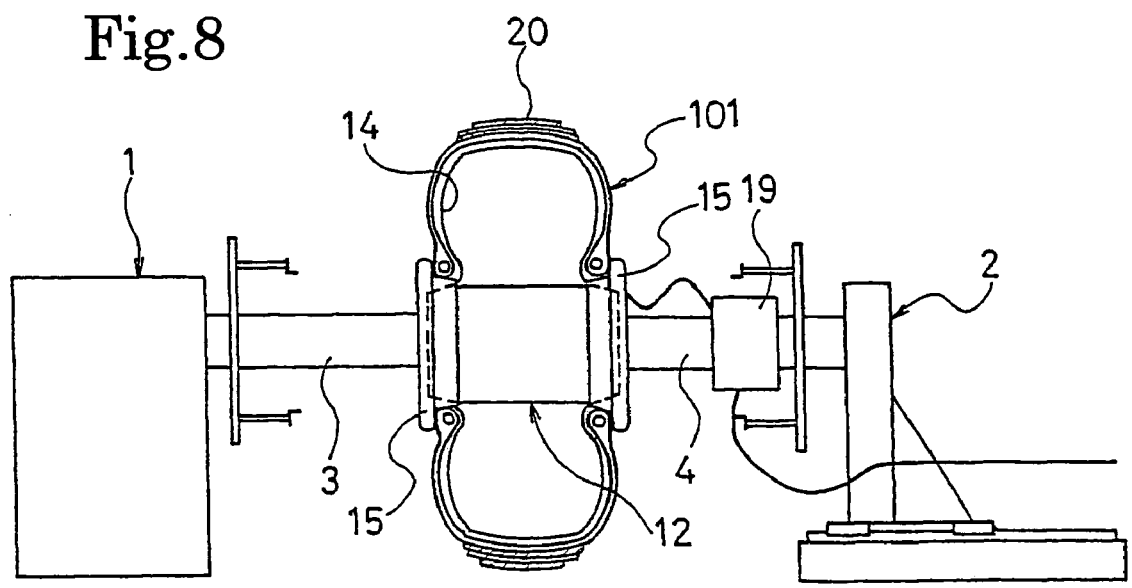
FIG. 8 is an explanatory diagram showing a process of winding belts around the first green tire which has been placed in the first step molding machine.

The first green tire 101 which has been set at the predetermined outside diameter and the predetermined rim width is caused to change its position from vertical to horizontal in terms of its axis direction by use of a turning machine which is not illustrated, while the vulcanizer bladder unit 12 is still being installed to the first green tire 101. On the other hand, the forming drum 5 is removed from the drive shaft 3 of the first step molding machine 100. Subsequently, the first green tire 101, which has been held horizontally as described above, is hoisted by a crane 18 as shown in FIG. 7, or is carried by a forklift, while the vulcanizer bladder unit 12 is still being installed to the first green tire 101. Thereby, the first green tire 101 is mounted onto the drive shaft 3 of the first step mold machine 100 once again.

Figure 9:
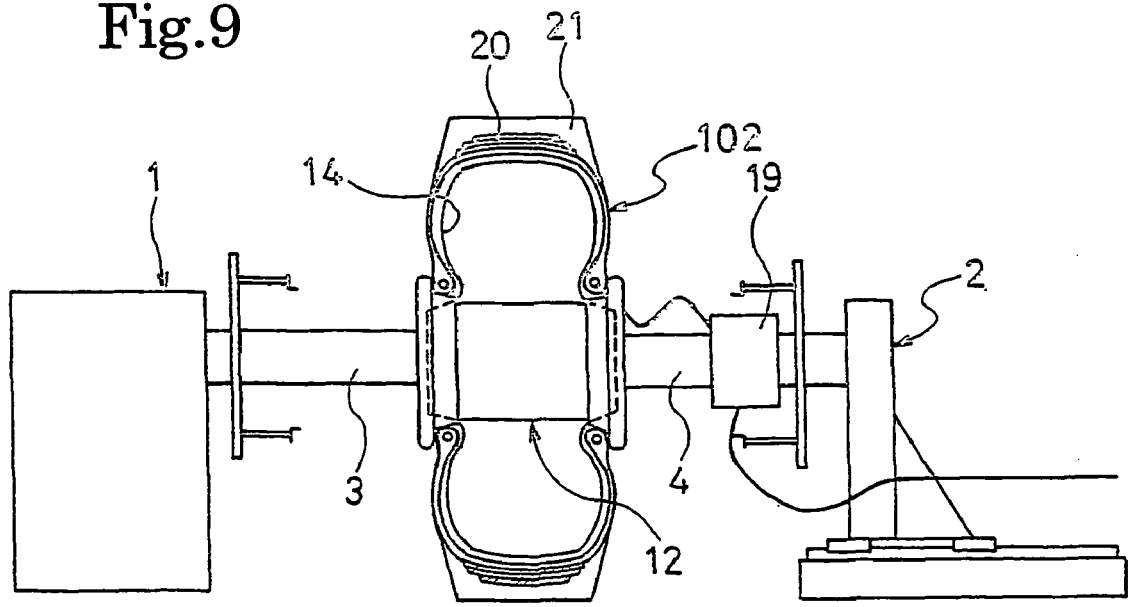
FIG. 9 is an explanatory diagram showing a process of obtaining a completed green tire by winding tread rubber around the outer periphery of the belts following the step of FIG. 8.

Then, the first green tire 101 is put into a condition where the driven shaft 4 of the tailstock 2 is fitted into the first green tire 101 mounted on the drive shaft 3 of the headstock 1. In addition, compressed air is supplied from an air supplying unit 19 to the bladder 14 of the vulcanizer bladder unit 12, thereby keeping the first green tire 101 in the inflated condition. Several plies of belt 20 made of steel cord are wound around the outer periphery of this first green tire 101. Thereafter, tread rubber 21 is wound around the outer periphery of the belt 20, as shown in FIG. 9. In this manner, the first green tire is formed into a second green tire, namely a completed green tire 102.

Figure 10:
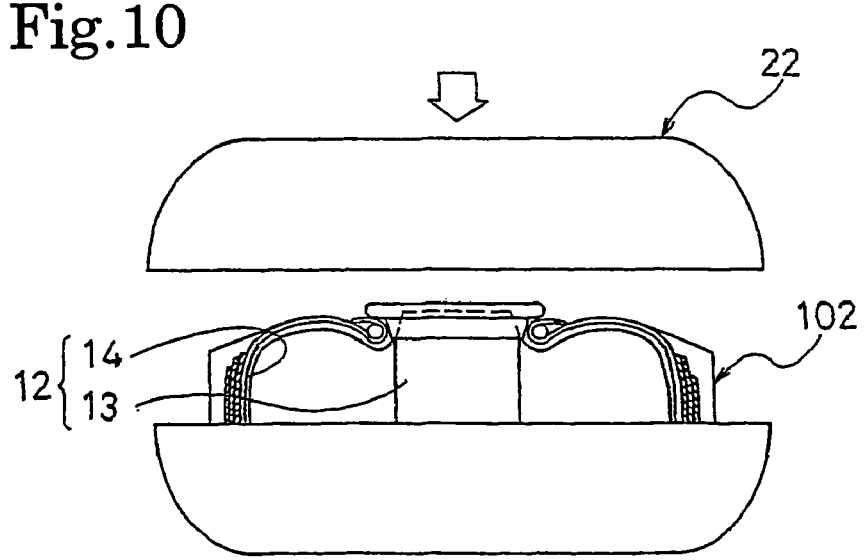
FIG. 10 is an explanatory diagram showing a process of vulcanizing the completed green tire, which has been obtained in the process of FIG. 9, in a vulcanizing mold.

The completed green tire 102, which has been obtained in the manner as described above, is removed from the first step molding machine 100 while the vulcanizer bladder unit 12 is still being installed to the completed green tire 102. Then, the completed green tire 102 is assembled in a vulcanizing mold 22, as shown in FIG. 10. Subsequently, the completed green tire 102 which has been set in the vulcanizing mold 22 is heated while being kept in the inflated condition by the vulcanizer bladder unit 12, thus vulcanizing and hardening the completed green tire 102. In this manner, the vulcanizing of the radial tire for a construction vehicle is completed.

According to the present invention, the second step molding process is performed as described above. Its main points are as follows. The vulcanizer bladder unit which has been removed from the curing machine is installed to the first green tire. The first green tire is put into an inflated condition by this vulcanizer bladder unit, and is installed into the first step molding machine once again. Thereafter, belts and tread rubber are adhered to the outer periphery of the first green tire. This no longer requires the specialized second step molding machine, which has been essential for the conventional production method. The present invention not only entails no facilities costs for the specialized second step molding machine, but also requires no space in which the second step molding machine would otherwise be installed. Consequently, this enables costs for producing a radial tire for a construction vehicle to be reduced to a large extent.

What is claimed is:

1. A method of producing a radial tire for a construction vehicle, in which a first green tire is removed from a first step molding machine after the first green tire is formed by the first step molding machine; a vulcanizer bladder unit is installed to the first green tire thus removed, and the first green tire is inflated by the vulcanizer bladder unit; subsequently the first green tire is once again placed in the first step molding machine while the vulcanizer bladder unit is still being installed to the first green tire; belts and tread rubber are adhered to the outer periphery of the first green tire on the first step molding machine to form the first green tire into a completed green tire; and the completed green tire is assembled into a vulcanizing mold while the vulcanizer bladder unit is still being installed on the completed green tire to be vulcanized.

2. The method of producing a radial tire for a construction vehicle according to claim 1, wherein the process of forming the first green tire in the first step molding machine comprises:

mounting a carcass ply cylindrically onto the outside of a forming drum provided on the first step molding machine;

transferring bead core assemblies respectively to two end portions of the carcass ply in the axis direction, and folding back the two end portions of the carcass ply to wrap the bead core assemblies respectively; and winding side rubber around an outer periphery of each of the two end portions of the carcass ply thus folded back.

3. The method of producing a radial tire for a construction vehicle according to claim 2, wherein the process of placing the first green tire to the first step molding machine once again comprises:

removing the forming drum from the first step molding machine, and thereafter placing the first green tire to the first step molding machine instead of the forming drum.

4. The method of producing a radial tire for a construction vehicle according to any one of claims 1 to 3, wherein a surface of a bladder of the vulcanizer bladder unit is coated with a mold lubricant in advance when the vulcanizer bladder unit is installed into the first green tire which has been removed from the first step molding machine.

* * * * *